United States Patent
Kermani

(10) Patent No.: US 6,314,499 B1
(45) Date of Patent: Nov. 6, 2001

(54) NON-PREEMPTIVE MEMORY LOCKING MECHANISM IN A SHARED RESOURCE SYSTEM

(75) Inventor: Bahram G. Kermani, Whitehall, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/078,037

(22) Filed: May 13, 1998

Related U.S. Application Data

(60) Provisional application No. 60/065,855, filed on Nov. 14, 1997.

(51) Int. Cl.[7] ............................................. G06F 12/00
(52) U.S. Cl. .................. 711/147; 711/152; 711/151; 711/150; 711/149
(58) Field of Search .................................... 711/147, 149, 711/150, 151, 152

(56) References Cited

U.S. PATENT DOCUMENTS

| | | | | |
|---|---|---|---|---|
| 5,175,837 | * | 12/1992 | Arnold et al. ........................ | 395/425 |
| 5,557,783 | * | 9/1996 | Oktay et al. ......................... | 395/550 |
| 5,566,123 | * | 10/1996 | Freidin ............................. | 365/230.05 |
| 5,659,711 | * | 8/1997 | Sugita ................................ | 395/476 |
| 5,802,581 | * | 9/1998 | Nelsen ............................... | 711/151 |
| 5,802,597 | * | 9/1998 | Nelsen ............................... | 711/169 |
| 5,826,056 | * | 10/1998 | Noda ................................. | 395/494 |
| 5,844,856 | * | 12/1998 | Taylor .............................. | 365/230.03 |
| 5,933,855 | * | 8/1999 | Rubinstein .......................... | 711/200 |
| 5,991,230 | * | 12/1998 | Urakawa ............................. | 365/233 |
| 6,006,319 | * | 12/1999 | Takahashi et al. ..................... | 712/34 |
| 6,014,729 | * | 1/2000 | Lannan et al. ........................ | 711/150 |
| 6,032,232 | * | 2/2000 | Lindeborg et al. .................... | 711/149 |
| 6,035,360 | * | 3/2000 | Doidge et al. ........................ | 710/107 |

* cited by examiner

*Primary Examiner*—Do Hyun Yoo
*Assistant Examiner*—Kimberly McLean
(74) *Attorney, Agent, or Firm*—William H. Bollman

(57) ABSTRACT

A multiple agent system providing each of a plurality of agents, i.e., processors, access to a shared synchronous memory. A super agent may be an agent from among a plurality of agents which accesses a shared synchronous memory most frequently. The super agent has direct access to the shared synchronous memory, without negotiation and/or arbitration, while the non-super agents access the shared synchronous memory under the control of an arbiter-and-switch. Open windows are generated when the super agent is not accessing the shared synchronous memory. The non-super agents can be allowed interim access to the shared synchronous memory even before the super agent terminates ownership of the shared synchronous memory. In another aspect of the present invention, subsequent memory access request signals from an agent to the shared synchronous memory are suppressed for a minimum refractory period until a previously received acknowledge signal is cleared to prevent erroneous detection of memory access granted acknowledge signals. In yet another aspect, a pre-arbiter intercepts memory access request signals from each of the agents and outputs a respective conditioned pre-arbitrated memory access request signal to provide the ability for one or more agents to lock ownership of the shared synchronous memory.

17 Claims, 9 Drawing Sheets

NON-PREEMPTIVE MEMORY LOCKING MECHANISM IN A SHARED RESOURCE SYSTEM

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to the shared usage of synchronous memory by a plurality of processing agents, e.g., processors.

2. Background of Related Art

With the ever-increasing speeds of today's processors, memory designs have attempted to meet the required speed requirements. For instance, synchronous memory such as synchronous static random access memory (SSRAM) and synchronous dynamic random access memory (SDRAM) are commonly available synchronous types of memory.

Synchronous memory technology is currently used in a wide variety of applications to close the gap between the needs of high-speed processors and the access time of asynchronous memory such as dynamic random access memory (DRAM). Synchronous memory, e.g., SDRAM technology, combines industry advances in fast dynamic random access memory (DRAM) with a high-speed interface.

Functionally, an SDRAM resembles a conventional DRAM, i.e., it is dynamic and must be refreshed. However, the SDRAM architecture has improvements over standard DRAMs. For instance, an SDRAM may use internal pipelining to improve throughput and on-chip interleaving between separate memory banks to eliminate gaps in output data.

The idea of using a SDRAM synchronously (as opposed to using a DRAM asynchronously) emerged in light of increasing data transfer demands of high-end processors. SDRAM circuit designs are based on state machine operation instead of being level/pulse width driven as in conventional asynchronous memory devices. Instead, the inputs are latched by the system clock. Since all timing is based on the same synchronous clock, designers can achieve better specification margins. Moreover, since the SDRAM access is programmable, designers can improve bus utilization because the processor can be synchronized to the SDRAM output.

The core of an SDRAM device is a standard DRAM with the important addition of synchronous control logic. By synchronizing all address, data and control signals with a single clock signal, SDRAM technology enhances performance, simplifies design and provides faster data transfer.

Similar advantages hold for other types of synchronous memory, e.g., SSRAM or even synchronous read only memory.

Synchronous memory requires a clock signal from the accessing agent to allow fully synchronous operation with respect to the accessing agent. If more than one agent is given access to a shared synchronous memory, each agent must conventionally supply its own clock signal to the synchronous memory. Unfortunately, the clock signals from separate agents are not conventionally synchronous or in phase with one another. Therefore, if a synchronous memory were to be shared among a plurality of agents, delays or wait states would be required to allow an error-free transition between access by a first agent having a first synchronous memory access clock signal and a subsequent access by another agent having a different synchronous memory access clock signal.

Some synchronous memory devices have the capability to provide burst input/output (I/O), particularly for the optimization of cache memory fills at the system frequency. Advanced features such as programmable burst mode and burst length improve memory system performance and flexibility in conventional synchronous memories, and eliminate the need to insert otherwise unnecessary wait states, e.g., dormant clock cycles, between individual accesses in the burst.

Conventional SDRAM devices include independent, fixed memory sections that can be accessed individually or in an interleaved fashion. For instance, two independent banks in an SDRAM device allow that device to have two different rows active at the same time. This means that data can be read from or written to one bank while the other bank is being precharged. The setup normally associated with precharging and activating a row can be hidden by interleaving the bank accesses.

FIG. 11 shows a conventional synchronous memory system having only one agent 100 and a synchronous memory, e.g., SDRAM 502. The single agent 100 communicates with the synchronous memory using appropriate address, data and control buses (ADC) 506, and one or more clock signals 504. Because the synchronous memory 502 has only the single accessing agent 100, the synchronous memory 302 need only contend with access from a single source.

Conventional processing systems utilizing a plurality of agents have separate memory for each agent. However, depending upon the particular application, it is likely that all memory will not be used by all agents at all times, and thus wasted memory resources may result in each of the separate memories.

There is thus a need for synchronous memory systems which allow efficient use of synchronous memory resources by a plurality of agents.

SUMMARY OF THE INVENTION

In accordance with the principles of the present invention, a non-preemptive arbitration system comprises a pre-arbiter to condition memory access request signals from a plurality of agents sharing a common resource. An arbiter arbitrates and selects one of the plurality of agents for subsequent access to the common resource. The pre-arbiter is capable of conditioning the memory access request signals by suppressing subsequent memory access signals from one of the plurality of agents which currently accesses the common resource when a locking memory access request signal is received from another one of the plurality of agents.

A method of arbitrating from among a plurality of resource request signals for access to a common resource in accordance with the principles of the present invention comprises providing access to the common resource by a first agent. Memory access request signals from the first agent to an arbitrator are monitored, and an inactive memory access cycle in the first agent's access to the common resource is determined. A second agent is allowed to access the common resource during the inactive memory access cycle in the first agent's access to the common resource.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a variety of techniques used to allow a plurality of agents to share a common synchronous memory.

Figure 1:
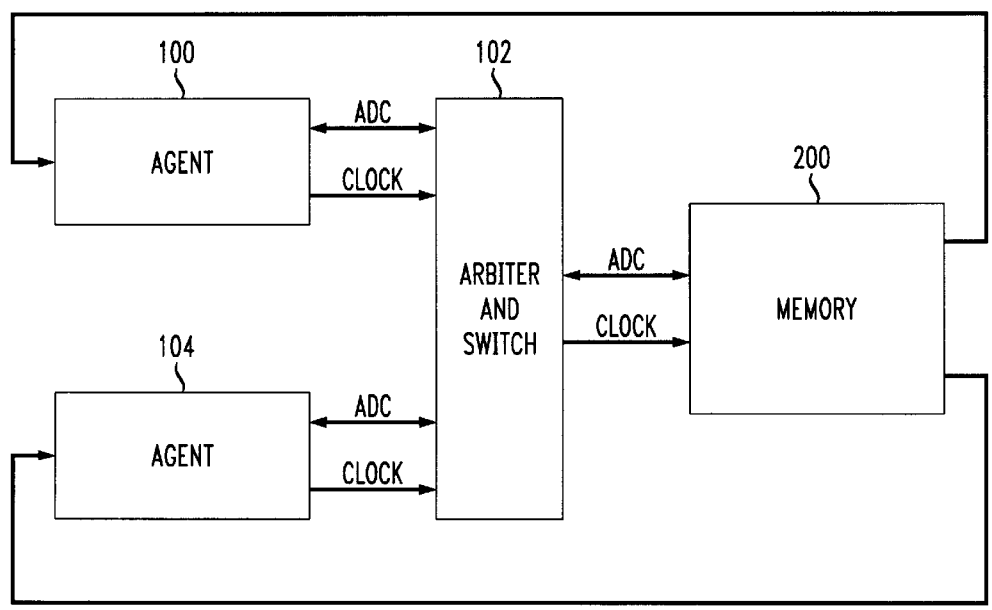
FIG. 1 shows a basic block diagram of a plurality of agents sharing a common synchronous memory in accordance with the principles of the present invention.

FIG. 1 shows a basic block diagram of a plurality of agents 100 and 104 sharing a common synchronous memory 200 in accordance with the principles of the present invention. The specific embodiment discloses relates to SSRAM, but the principles of the present invention relate equally to all types of synchronous memory.

In particular, each of the plurality of agents 100, 104 may be any suitable processing element, e.g., a digital signal processor (DSP), on-demand transfer (ODT) engine, microprocessor or microcontroller. Moreover, one of the agents can be a master processor in a multiprocessor system, and the other agents can be slave peripheral devices or co-processors.

An arbitrator and switch 102 allows one of the plurality of agents 100 or 104 to access the shared synchronous memory 200 at any time. The arbiter-and-switch 102 switches the address, data and control buses and the clock signal(s) of the selected agent 100 or 104 to the respective address, data and control buses and clock signal(s) of the shared synchronous memory 200 when appropriate. The arbiter-and-switch 102 is adapted and arranged to multiplex input ADC and clock signals while preventing glitches or erroneous clock signals from being presented to the shared synchronous memory 200.

Figure 2:
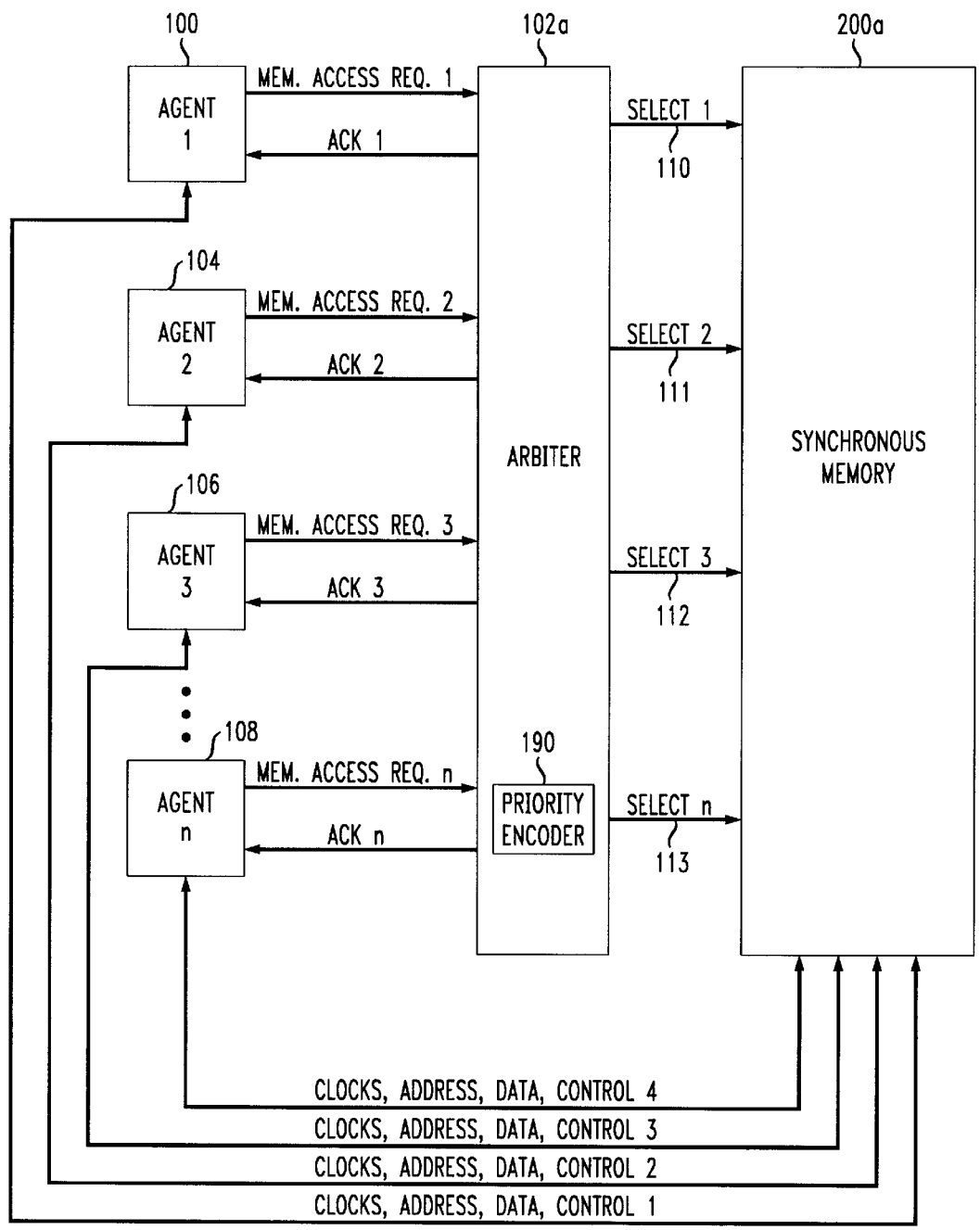
FIG. 2 shows a more detailed block diagram of a multi-agent synchronous memory system in accordance with the principles of one aspect of the present invention.

FIG. 2 shows a more detailed block diagram of an exemplary multi-agent system which is adapted to arbitrate for individual access to a shared synchronous memory 200a having multiple ports, in accordance with the principles of the present invention.

In particular, FIG. 2 shows a plurality n of agents 100 to 108 each having a clock signal, address bus, data bus and control bus which are presented to individual ports of the shared synchronous memory 200a. In FIG. 2, the switch function associated with the arbiter-and-switch 102 in FIG. 1 is shown instead as being integral to the multi-port shared synchronous memory 200a in FIG. 2. Thus, the shared synchronous memory 200a in FIG. 2 includes appropriate switching circuitry including latches and multiplexers associated with each agent 100 to 108. The switching circuitry in the shared synchronous memory 200a allows access to a common memory block by a selected one of the plurality of agents 100 to 108 at any one time. Of course, the appropriate switching circuitry may be alternatively included in the arbiter 102a in FIG. 1, or other element within the principles of the present invention.

Each of the agents 100 to 108 has appropriate clock, address, data and control signal paths to the shared synchronous memory 200, the signals for only one agent of which is selected for access at any one time by an activation of the corresponding select signal 110–113. Only one select signal 110–113 should be active at any one time.

The arbiter 102a shown in FIG. 2 receives an individual memory access request signal from the agents 100 to 108 as necessary, and returns a corresponding acknowledge signal to a winning requesting agent 100 to 108 upon granting of access by that winning agent to the shared synchronous memory 200a. Upon selection of the winning agent, a selection signal is transmitted by the arbiter 102a to the switching elements, e.g., multiplexing elements in the shared synchronous memory 200a on a corresponding selection signal path 110 to 113. Alternatively, the selection signal paths 110–113 may be consolidated into one or more communication paths from the arbiter 102a to the shared synchronous memory 200a.

In accordance with the principles of this aspect of the invention, each of the plurality of agents 100 to 108 submits its own memory access request signal to the arbiter 102a. If more than one memory access request signal is received by the arbiter 102a during any one clock cycle, a winning agent is preferably selected based on a priority level assigned to each of the requesting agents. Preferably, a unique priority level is established for each of the plurality of agents 100 to 108 either before operation of the system or on-the-fly as the system is operated. Alternatively, a priority level can be assigned to each of the agents 100 to 108 using a hardwired encoder 190 in the arbiter 102a.

Once the arbiter 102a selects a winning agent from among those making substantially simultaneous memory access requests, e.g., by selecting that requesting agent having the highest priority, the arbiter 102a informs the shared synchronous memory 200a of the owner of the next memory access by activation of the appropriate select line 110–113. Activation of any one of the select lines 110 to 113 steers the appropriate circuitry corresponding to the clock, address, data, and control multiplexers in the shared synchronous memory 200a toward the winning agent.

Thus, each of a plurality of equal level agents requests access to a shared synchronous memory by sending a request signal to a central arbiter. The central arbiter may select a winning agent based on a predetermined priority for the access, based on a clock which is different from each of the clocks of the respective agents.

In accordance with the aspect of the present invention, once granted ownership of the shared synchronous memory 200a, that ownership by one of a plurality of equal level agents 100 to 108 is preferably not pre-emptable by the other equal level agents unless and until the owning agent removes its respective memory access request signal from the arbiter 102a. Upon discontinuation of the memory access request signal from the arbiter 102a, ownership of that agent is discontinued. Once the previous owning agent drops or inactivates its respective memory access request signal from the arbiter 102a, any and all of the other waiting agents are arbitrated by the arbiter 102a for subsequent access by a new winning agent to the shared synchronous memory 200a, e.g., based on the predetermined priority.

In accordance with the principles of other aspects of the present invention, one of the plurality of agents, e.g., agent 100 as shown in FIGS. 1 and 2, may be designated as having a higher level (e.g., a super level) with respect to the other agents, e.g., agents 104 to 108 as shown in FIGS. 1 and 2. The higher level agent may be designated as a super agent, and the other agents may be designated as non-super agents. Alternatively, a lower priority agent may instead be the super agent. A super agent may be an agent whose access cannot be halted and/or must be serviced with zero time delay, or a super agent may be an agent from among the plurality of agents which accesses the shared synchronous memory most frequently. If more than one super agent is used, the higher priority agent will win a request for a shared resource.

It is within the principles of the present invention as will be discussed in more detail herein below to designate one of the plurality of agents as a winning agent and allowing that winning agent to communicate with the shared synchronous memory 200 without requiring that winning agent to arbitrate for ownership of the shared synchronous memory 200. In this case, all other agents would monitor the winning agent's communications with the shared synchronous memory 200.

Figure 3:
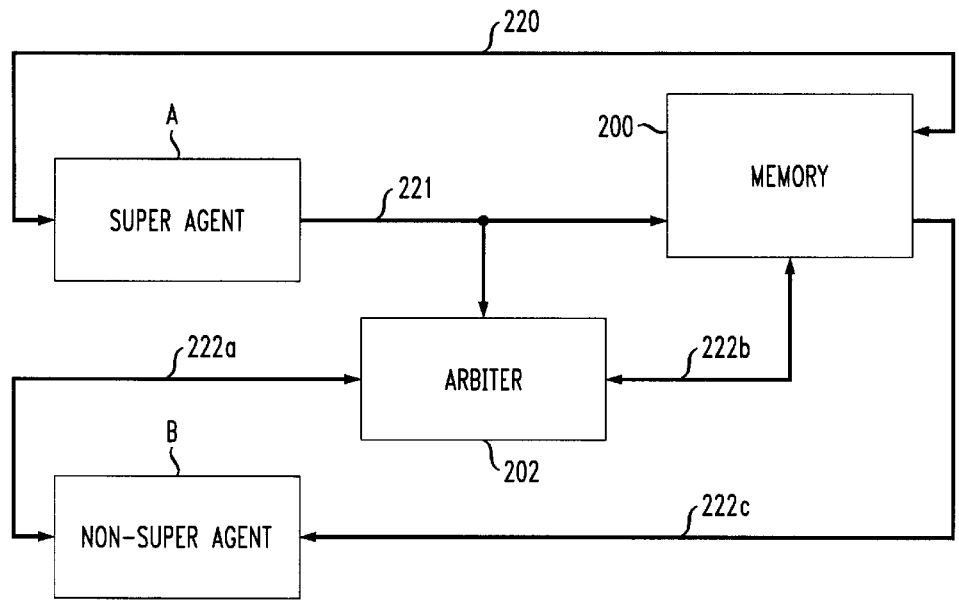
FIG. 3 shows a plurality of agents including a super agent and a non-super agent wherein the super agent is provided uninhibited access to shared synchronous memory.

For instance, FIG. 3 shows a plurality of agents including a super agent A and a non-super agent B wherein the super agent A is allowed to communicate with the shared synchronous memory 200 without arbitration.

In particular, FIG. 3 shows a shared synchronous memory 200 which is accessible by both a super agent A and a non-super agent B. The super agent A has direct access to the shared synchronous memory 200, while the non-super agent B accesses the shared synchronous memory 200 under the control of an arbiter-and-switch 102. Thus, the super agent A requests access to the shared synchronous memory 200 directly via a communication path 221, while the non-super agent B requests access to the shared synchronous memory 200 via the arbiter-and-switch 202 using communication paths 222a and 222b.

The arbiter-and-switch 202 monitors accesses by the super agent A to the shared synchronous memory 200, e.g., to determine open windows wherein the super agent A would not be affected by an access to the shared synchronous memory 200 by another agent. The non-super agent B can submit memory request signals to the arbiter-and-switch 202 at any time. However, for this non-super agent B, ownership of the shared synchronous memory is granted on a cycle-by-cycle basis of the clock signal—only when access by the super agent A is not necessary.

The arbiter-and-switch 202 implements predetermined rules with respect to access provided to the shared synchronous memory 200 by the non-super agent B. The predetermined rules provide that the super agent A is provided transparent access to the shared synchronous memory 200, i.e., whenever desired. Thus, the super agent A is provided access to the shared synchronous memory 200 without arbitration and/or negotiation.

Arbitration from among a plurality of non-super agents may be on a first-come, first-served basis, on a priority basis, or other suitable decisive decision criteria by the arbiter-and-switch 202 in accordance with the principles of the present invention.

For instance, the winning non-super agent may be provided time division multiplexed access to the shared synchronous memory. Using this technique, each non-super agent B may be assigned a constant time interval for access when the super agent A is not accessing the shared synchronous memory 200. When the super agent A is not accessing the shared synchronous memory 200, an open window is generated allowing the other non-super agents B free access to the shared synchronous memory in accordance with the time slots determined by a free-running clock. If an open window is not available when a request is made by a non-super agent B, the arbitrated non-super agent must wait until an open window becomes available to access the shared synchronous memory 200.

Open windows exist when the super agent A is not accessing the shared synchronous memory 200. However, an open window may also exist when the super agent A has initiated an access to the shared synchronous memory 200 but has stalled or extended its access for other reasons, e.g., when wait states are generated due to an access to external memory, bus conflict or other reason. During the extended period and/or wait states, the shared synchronous memory 200 may be given interim access by a non-super agent B. A halt or power down signal in the super agent A may also cause a significant clock extension, allowing extended interim use of the shared synchronous memory 200 by the non-super agents. This interim use of the shared synchronous memory 200 during selected cycles (e.g., wait states) during the super agent A's ownership of the shared synchronous memory is referred to as adaptive instruction cycle stealing or simple cycle stealing. It is adaptive in the sense that the interim access granted to non-super agents adapts to the length of the extended access by the super agent A.

One or more non-super agents may access the shared synchronous memory during any one open window, depending upon the number of free-running clock cycles in each open window.

Figure 4:
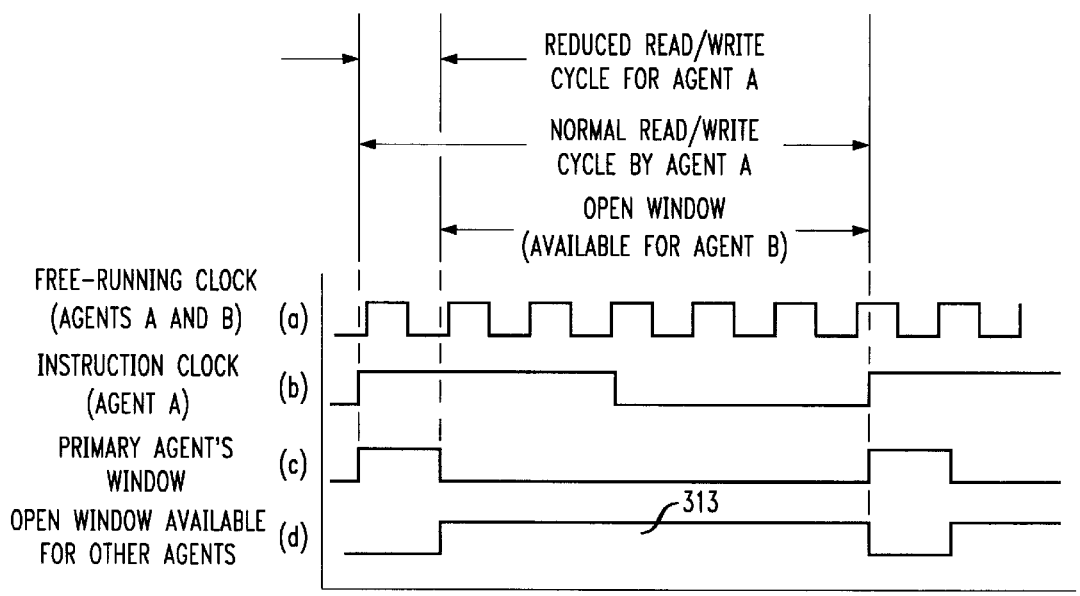
FIG. 4 shows an open window generated between accesses to the shared synchronous memory by a super agent.

FIG. 4 shows an interim open window of the adaptive instruction cycle stealing technique wherein an open window is generated even when an access to the shared synchronous memory by the super agent has not yet terminated (from super agent A's perspective), e.g., during wait states in an extended access lasting more than a single memory clock cycle.

In particular, waveform (a) of FIG. 4 shows the free-running clock signal with respect to both the super agent A and the non-super agent B. Waveform (b) shows an extended instruction cycle of the super agent A. Waveform (c) shows the time required for access to the shared synchronous memory 200, i.e., one clock cycle of the free-running clock signal shown in waveform (a). The remainder of the time during the access by the super agent A results in an open window 313 shown in waveform (d).

Thus, in accordance with the principles of the present invention, non-super agents arbitrate for ownership and access to the shared synchronous memory 200 during open windows of time, either between accesses by a super agent or in the interim during an extended access by the super agent A. Interim open windows can be combined with open windows generated between accesses by the super agent to form larger access windows for use by one or more non-super agents.

To access the shared synchronous memory 200 from a nonsuper user B while the super agent A is in an extended access, each of the agents A, B are preferably provided with a different output latch in the shared synchronous memory 200 to avoid overwriting of data accessed by another agent.

The open window is not limited to a single cycle. For instance, in general, if a cycle extension of a memory request from the super agent A lasts for N cycles, the first cycle might be used by the super agent A to access the shared synchronous memory 200, while an open window having a length of N−1 cycles of the free-running clock would be generated for use by the non-super agents, e.g., non-super agent B.

Use of open windows in a super agent's accesses to shared synchronous memory in accordance with the principles of the present invention can provide significant increases in the performance of the overall system, particularly with respect to the super agent A. For example, in one example wherein the super agent is a DSP, the performance of the DSP as measured by million instructions per second (MIPS) can be increased by approximately 30% or more, depending upon the particular application.

Figure 5:
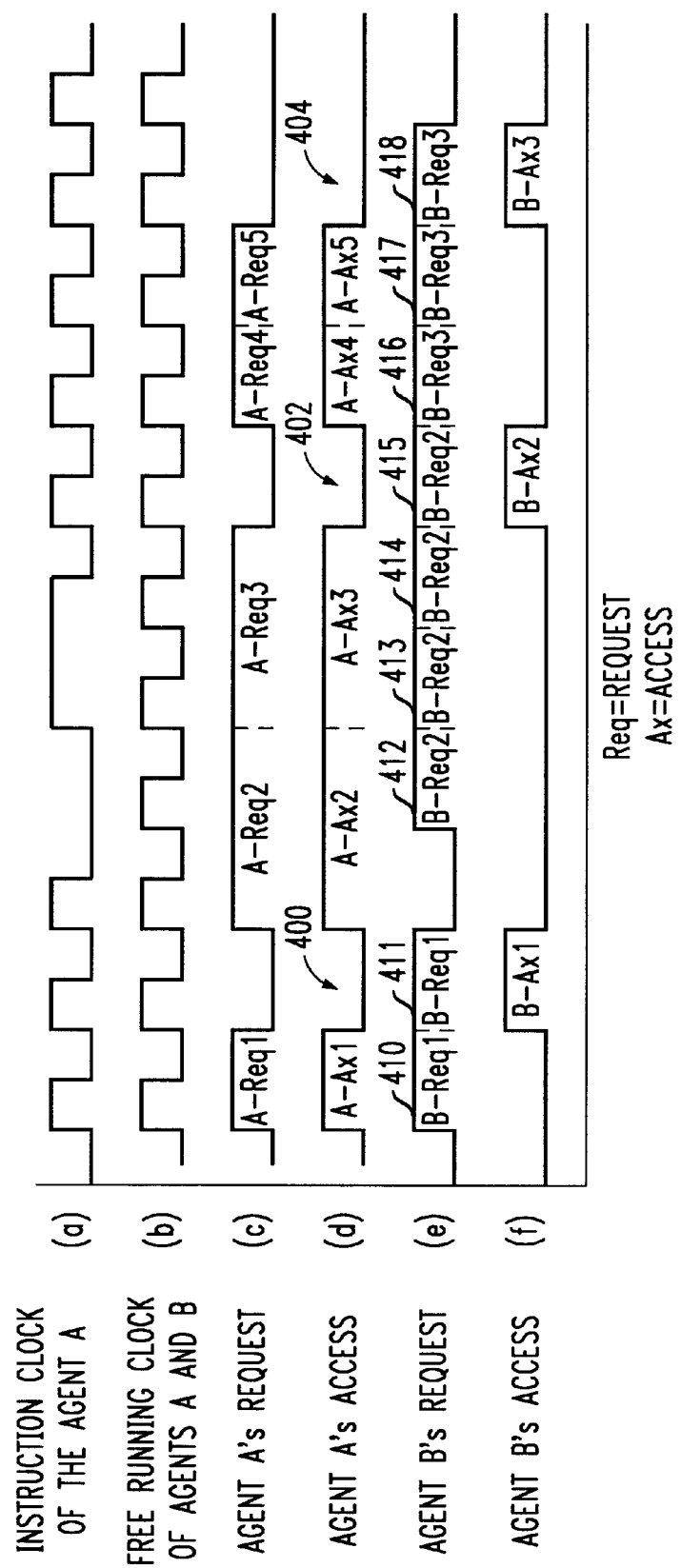
FIG. 5 shows memory request signals relating to the sharing of a synchronous memory by a super agent and a non-super agent.
Figure 6:
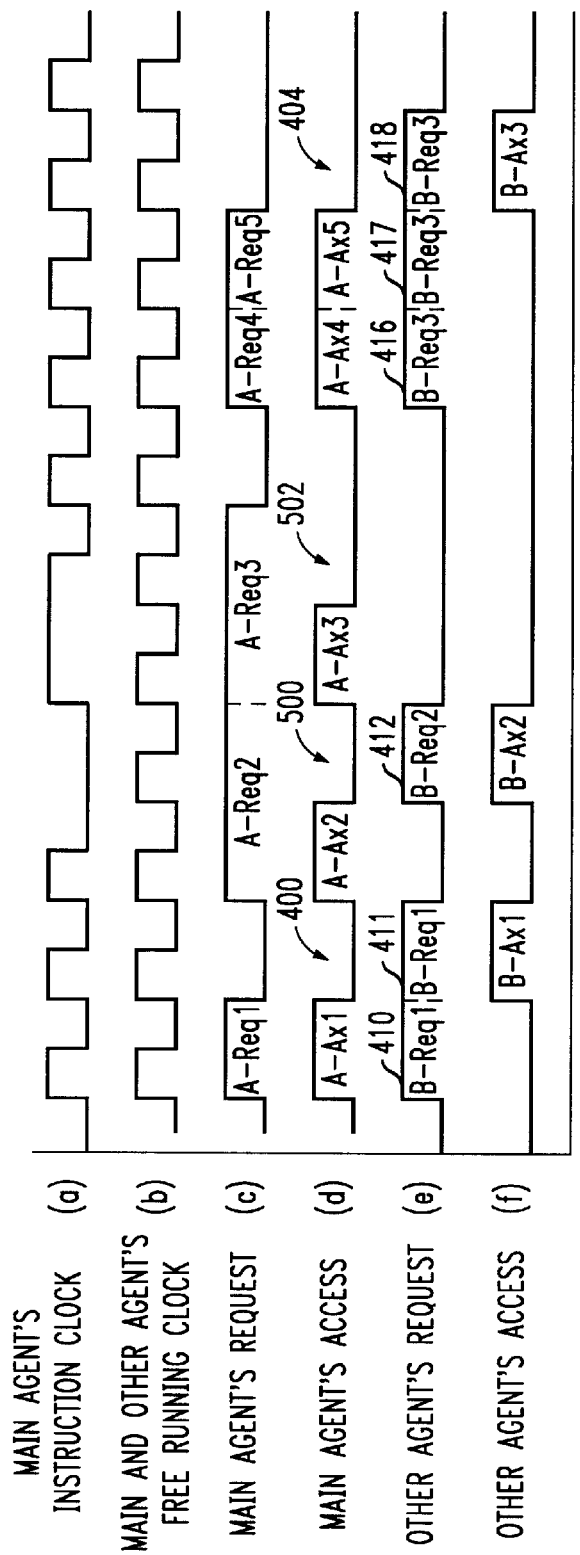
FIG. 6 shows memory request signals relating to the sharing of a synchronous memory by a super agent and a non-super agent in accordance with another aspect of the present invention.

FIG. 5 shows in more detail an example of the granting of memory access requests to a non-super agent B during open windows between separate memory accesses by a super agent A, and FIG. 6 shows in more detail the same example but allowing non-super agents to access the shared memory during interim open windows generated within extended accesses by the super agent, both in accordance with the principles of the present invention.

In particular, waveform (a) of FIG. 5 shows an example of an instruction clock cycle of a super agent A, and waveform (b) shows the free-running clock on which the accesses to the shared synchronous memory 200 are based.

The super agent A outputs in sequence five memory access requests A-Req1, A-Req2, A-Req3, A-Req4 and A-Req5, as shown in waveform (c) of FIG. 5. The first memory access request A-Req1 has a length of one clock cycle, the second and third memory access requests A-Req2 and A-Req3 each have a length of two clock cycles, and the fourth and fifth memory access requests A-Req4 and A-Req5 each have a length of one clock cycle.

Waveform (d) shows the granting of five accesses A-Ax1, A-Ax2, A-Ax3, A-Ax4 and A-Ax5 to the super agent A's memory access requests at the time and for the number of clock cycles corresponding to the respective memory access requests A-Req1, A-Req2, A-Req3, AReq4 and A-Req5. However, in accordance with the principles of the present invention, open windows are formed between the separate accesses by the super agent A. In particular, a first open window 400 is formed between the first and second memory accesses A-Ax1 and A-Ax2 of the super agent A, a second open window 402 is formed between the third and fourth memory accesses A-Ax3 and A-Ax4 and a third open window 404 is formed after the fifth memory access A-Ax5.

Waveform (e) shows an example memory request sequence by a non-super agent B to access the shared synchronous memory 200, e.g., three times. In particular, the non-super agent B first requests access to the shared synchronous memory at 410. However, the super agent A requests access to the shared synchronous memory 200 during the same clock cycle, and thus the non-super agent B is not provided an acknowledgment to access the shared synchronous memory 200 during that clock cycle. Thus, the non-super agent B repeats the memory access request at 411 in the next clock cycle, which occurs during the first open window 400. Accordingly, as shown in the waveform (f) of FIG. 5, the non-super agent B is granted access to the shared synchronous memory 200 for no more than one clock cycle, i.e., the length of the open window.

Similarly, the non-super agent B again requests access to the shared synchronous memory 200 at 412, but is not given access because the super agent is utilizing the shared synchronous memory during that clock cycle. The non-super agent B thereafter requests access to the shared synchronous memory 200 again at 413 and 414 until it is finally granted access B-Ax2 as shown in waveform (f) during the second open window 402 pursuant to its fourth repeated memory access request B-Req2 at 415 as shown in waveform (e).

Likewise, it takes three memory access requests B-Req3 at 416, 417 and 418 before the non-super agent B is finally granted access B-Ax3 as shown in waveform (f) to the shared synchronous memory 200 in the third open window 404 as shown in waveform (d).

FIG. 6 shows that the non-super agents, e.g., non-super agent B, can be allowed interim access to the shared synchronous memory 200 even before the super agent A terminates ownership of the shared synchronous memory 200 (from the super agent A's perspective).

In particular, waveforms (a), (b) and (c) in FIG. 6 are as shown and described with respect to FIG. 5. However, as shown in FIG. 6, although the memory access requests from the super agent A such as the second memory access request A-Req2 may last for more than a single clock cycle, access is provided to the super agent for a shorter period of time, e.g., for only one clock cycle. Thus, as shown in waveform (d) of FIG. 6, the second and third accesses A-Ax2 and A-Ax3 of the super agent A are shortened to only one clock cycle each, forming a new open window at 500 and an extended open window at 502. Accordingly, as shown in waveform (e), the second memory access request B-Req2 as shown in waveform (e) of the non-super agent B gains access B-Ax2 as shown in waveform (f) after only the first try, as opposed to four repeated tries 412–415 as shown in waveform (e) of FIG. 5.

Thus, in accordance with the principles of the present invention, one of a plurality of agents accessing a shared synchronous memory is given a super agent priority. The super agent can access the shared synchronous memory without negotiation and/or arbitration. However, the remaining non-super agents can access the memory only when it is available, i.e., when the shared synchronous memory is not being used by the super agent.

The use of super/non-super agent distinction between a plurality of agents accessing a shared synchronous memory improves upon the degraded performance otherwise experienced by the overall system and in particular the super agent because of the overhead inherent in an arbitration process. With higher priority, the super agent is given access to the shared synchronous memory whenever requested and can thus access the shared synchronous memory without halting its operation.

Figure 7:
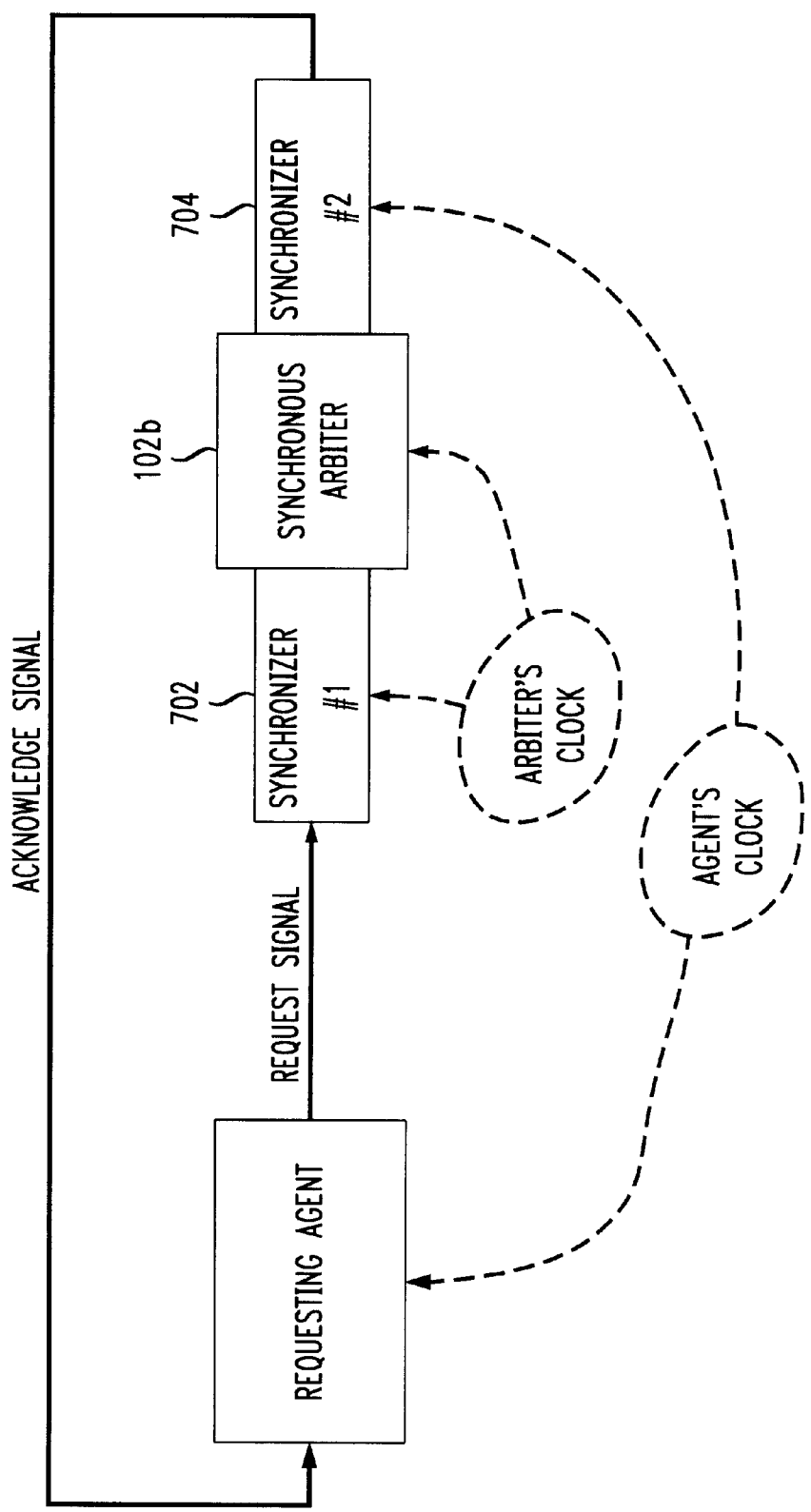
FIG. 7 shows an aspect of the present invention which prevents the appearance of erroneous memory access acknowledgment signals back to a requesting agent.

FIG. 7 shows an aspect of the present invention which prevents the appearance of erroneous memory access acknowledgment signals back to a requesting agent.

In particular, an internal clock in the arbiter 102b used to arbitrate ownership of the shared synchronous memory from among various requesting agents may be asynchronous with respect to the individual clock signals from each of the requesting agents. However, to sense a memory access request signal from a requesting agent, the arbiter 102b preferably synchronizes the individual memory access request signals from each of the requesting agents with respect to the internal clock of the arbiter 102a using a first synchronizing circuit 702. Moreover, the acknowledge signal returned from the arbiter 102b to the winning agent is preferably synchronized with respect to the winning agent's clock signal using a second synchronizing circuit 704. Thus, the memory access request signals from the agents to the arbiter 102b and the acknowledge signals from the arbiter 102b to each of the respective agents are not only similarly timed within the arbiter but return memory access granted acknowledge signals are also synchronized to match the timing of the requesting or winning agent.

An agent may repeatedly request access to the shared synchronous memory. However, a problem might arise otherwise when a requesting agent submits repeated memory access request signals to the arbiter 102a. In this case, the returned memory access granted acknowledge signal may experience delays up to several cycles in length due to the synchronizer circuit 704 as well as the electrical wiring between the arbiter 102b and the requesting agent. Thus, it is possible that when a second memory access request signal is output by a requesting agent soon after a first memory access request signal, the first memory access granted acknowledge signal from the arbiter 102b to the requesting agent may still be active when the second memory access request signal is output by the same requesting agent, particularly due to the delays in the synchronizer circuit 704 and other elements. If this situation arises, the requesting agent might erroneously interpret the first memory access granted acknowledge signal as an acknowledge signal corresponding as well to the second memory access request from the same agent, whereas that requesting agent should have waited for a second memory access granted acknowledge signal to be sent by the arbiter 102b. A conflict between agents might arise in this situation, particularly if another agent is cycle stealing or otherwise accessing the shared synchronous memory between accesses by the previous agent.

Figure 8A:
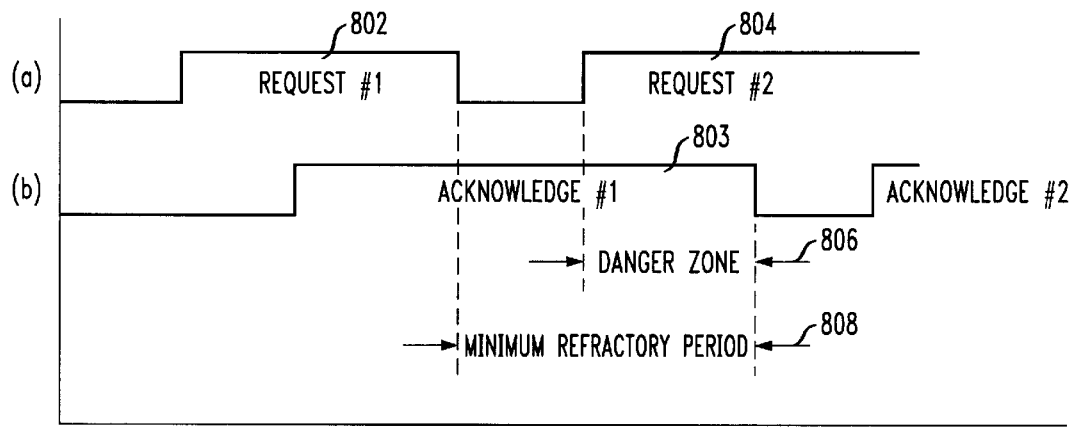
FIGS. 8A and 8B show timing diagrams illustrating how an erroneous detection of an acknowledge signal might otherwise occur without an aspect of the present invention.
Figure 8B:
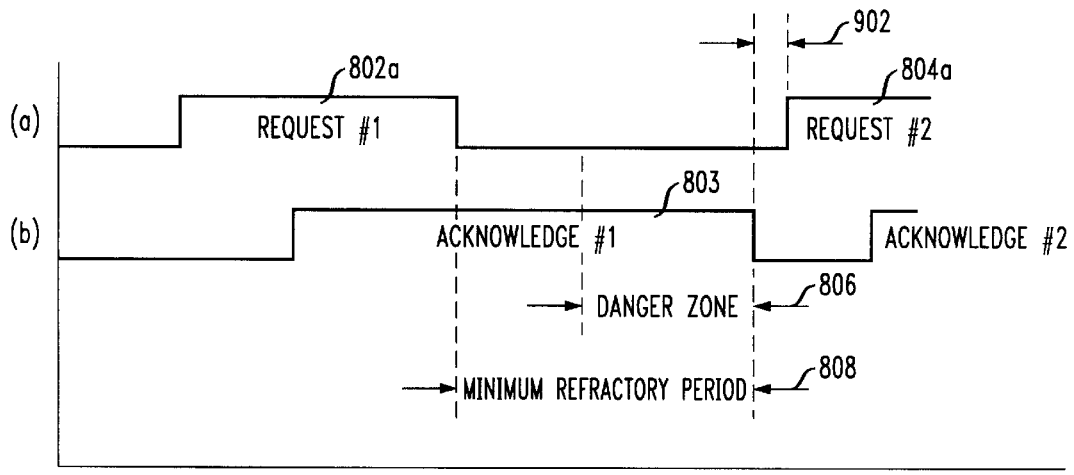

FIGS. 8A and 8B are timing diagrams illustrating how a memory access granted acknowledge signal might otherwise be erroneously detected without the present aspect of the invention.

In particular, waveform (a) of FIG. 8A shows two separate memory access request signals 802, 804 from the same requesting agent to the arbiter 102b. Waveform (b) of FIG. 8A shows the timing of a first memory access granted acknowledge signal 803 from the arbiter 102b back to the requesting agent with respect to the timing of the memory access request signals 802, 804 shown in waveform (a). As can be seen by a comparison of waveforms (a) and (b) of FIG. 8A, the first memory access granted acknowledge signal 803 extends beyond the point in time at which the second memory access request signal 804 is transmitted by the requesting agent, creating a danger zone 806 wherein both the second memory access request signal 804 and the first memory access granted acknowledge signal 803 are active. Thus, the requesting agent may misinterpret the first memory access granted acknowledge signal 803 as corresponding to not only the first memory access request signal 802 but also to the second memory access request signal 804, raising the possibility of a conflict for access to the shared synchronous memory.

A minimum refractory period 808 corresponds to the time between the end of the first memory access request signal 802 and the end of the corresponding first memory access granted acknowledge signal 803.

Waveforms (a) and (b) of FIG. 8B, on the other hand, show a suppression of the second memory access request signal 804a until after the minimum refractory period 808 has expired, creating a safety zone 902, in accordance with the principles of the present invention. The safety zone 902 is preferably kept to a minimum to minimize delays in the overall system, but should preferably be sufficient to prevent the second memory access request signal 804a as shown in waveform (a) of FIG. 8B from being output by the requesting agent when the previous memory access granted acknowledge signal 803 remains active as shown in waveform (b) of FIG. 8B.

The arbiter 102b may implement suppression of the second memory access request signal 804a during the minimum Refractory Period by, e.g., ANDing the respective memory access request signals with the output of a single-shot circuit. The single-shot circuit can be triggered by the removal of a memory access request signal, and may preferably remain active for a period of time after the memory access request signal is removed, e.g., for three clock cycles corresponding to the requesting agent's clock signal. Of course, other circuits which ensure a minimum period of time between subsequent memory access request signals may be implemented within the principles of the present invention.

Thus, according to this aspect of the present invention, a subsequent memory access request signal is submitted to the arbiter only after the acknowledge signal of the previous memory access request signal has been cleared. Subsequent memory access request signals are suppressed until a previously received acknowledge signal is cleared. The period of suppression of the memory access request signal is referred to herein as the 'Refractory Period'.

Moreover, the arbiter is synchronized with the requesting agents memory access request signals and returns synchronized memory access granted acknowledge signals. Moreover, repeated memory access request signals are suppressed for a minimum Refractory Period to prevent erroneous detection of memory access granted acknowledge signals.

Figure 9:
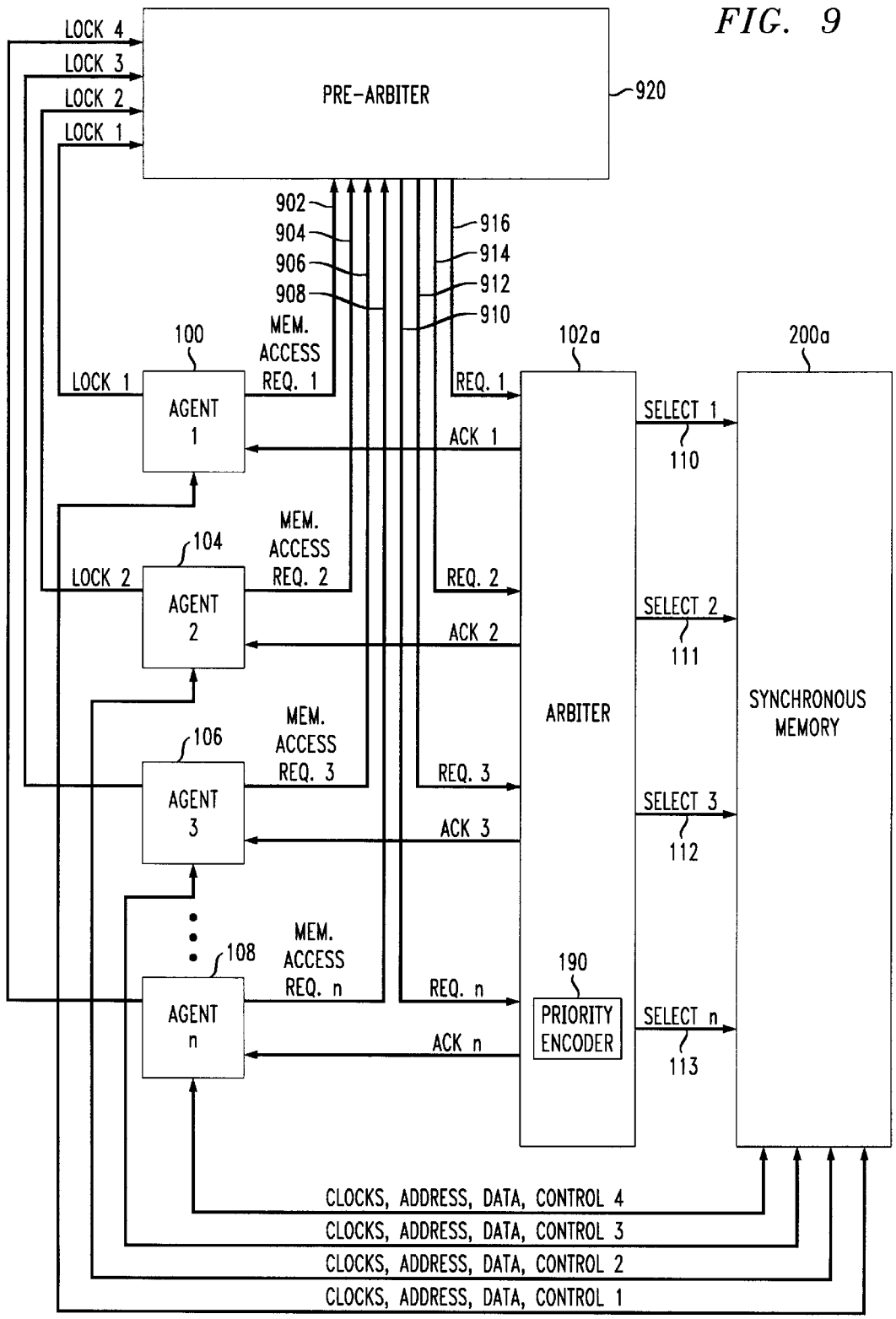
FIGS. 9 and 10 show another aspect of the present invention, i.e., a non-preemptive locking mechanism to lock ownership or access to the shared synchronous memory.
Figure 10:
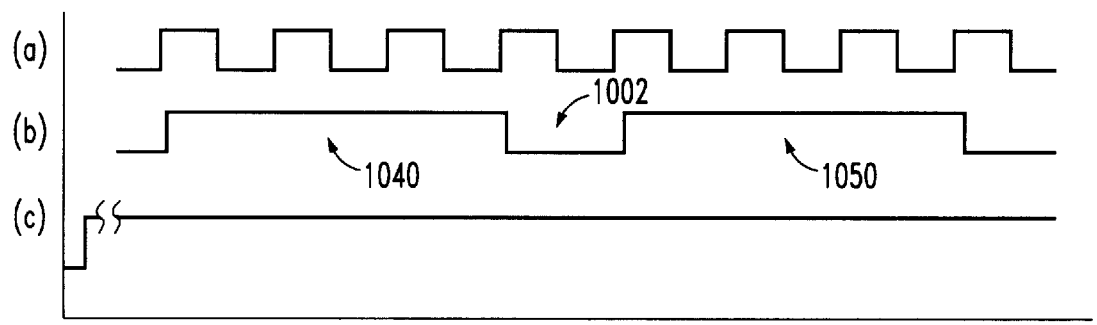
Figure 11:
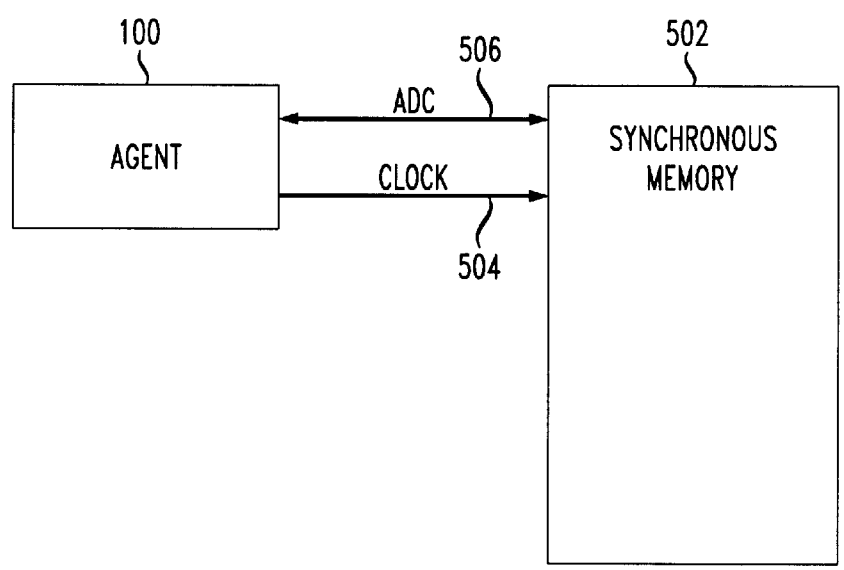
FIG. 11 shows a conventional un-shared synchronous memory system having a single agent.

FIGS. 9 and 10 show another aspect of the present invention including a non-preemptive locking mechanism to allow an agent to efficiently request a locking mechanism to access the shared synchronous memory by another agent without interruption and/or without affecting the previous agent's access to the shared synchronous memory.

In shared memory systems, memory access request signals from agents are accompanied by a time-hysteresis such that a purposeful delay of many cycles, e.g., six memory cycles, is added by an arbiter after a memory access request signal becomes inactive to prevent the need for the same agent to arbitrate to re-acquire ownership of the shared synchronous memory after one or just a few inactive memory cycles. However, the fixed time hysteresis may cause an inefficiency in the use of the shared synchronous memory in that the cycles during the time hysteresis may not be used by any agent.

As an example, presume that an agent running code from a shared memory requires, e.g., a minimum of 6 memory cycles to gain ownership of the shared synchronous memory. In this case, during an opcode fetch from the shared synchronous memory there are often instances wherein the shared synchronous memory is not accessed by that agent for one or two or more cycles. In this case, a time hysteresis of about 6 memory cycles would be implemented. Without hysteresis, the agent would constantly undergo arbitration for access to the shared synchronous memory, resulting in an excessive amount of delays for the agent. On the other hand, with hysteresis, relatively few periods of inactivity cause delays between a change in ownership of the shared synchronous memory.

There are two solutions to this problem in conventional non-synchronous systems: (1) end the current agent's access immediately when a locking agent requests access to the shared memory; or (2) wait for the currently accessing or owning agent to relinquish ownership of the shared memory. However, these solutions do not carry over to a synchronous environment using a shared synchronous memory. For instance, if the current agent's access is ceased immediately when a locking agent requests access to the shared synchronous memory, a loss of the data in the shared synchronous memory may be caused because the accessed data may take one or more cycles to propagate through the shared synchronous memory. Moreover, if a requesting locking agent waits for the currently owning agent to relinquish ownership of the shared synchronous memory, potentially long periods of delay may be possible while the requesting agent waits to be allowed access to the shared synchronous memory 200a. Depending upon the application, neither of these solutions may be preferred in a synchronous environment.

However, in accordance with the present aspect of the invention, a requesting locking agent can assume locked ownership of the shared synchronous memory at an appropriate time without losing memory cycles to a fixed amount of time hysteresis.

FIG. 9 is similar to FIG. 2 but shows the additional use of a pre-arbiter 920 between each of the arbiting agents 100, 104, 106, 108 and the arbiter 102a. The pre-arbiter 920 intercepts the memory access request signals 902, 904, 906, 908 from each of the agents 100, 104, 106, 108, respectively, and outputs a respective conditioned pre-arbitrated memory access request signal 914, 912, 910, 908 to the arbiter 102a on behalf of the agents 100, 104, 106, 108.

The pre-arbiter 920 in the disclosed embodiment provides the ability for any agent to lock its ownership of the shared synchronous memory 200a as necessary. Not all agents need to have the ability to lock the ownership of the shared synchronous memory 200a. The locked access to the shared synchronous memory 200a requested by an agent is preferably provided by the pre-arbiter 920 in a non-preemptive manner.

Thus, in accordance with the principles of the present aspect of the invention, a requesting agent presents a memory access request and a locking access request to the pre-arbiter 920 and then waits until the current owning agent experiences a lapse of, e.g., one clock cycle in its consecutive memory accesses. In that case, the locking agent disqualifies the current owning agent of the shared memory from its ownership at the point of the lapse and itself assumes ownership of the shared memory. Of course, more than one clock cycle could be monitored before a requesting locking agent assumes ownership of the shared synchronous memory, in accordance with the principles of the present invention.

The pre-arbiter 920 monitors the repeating memory access request signals 902–908 from the agents 100, 104, 106, 108 (as opposed to the respective constant select control signals 110, 111, 112, 113 from the arbiter 102a) to determine an opportune time to assume locked ownership of the shared synchronous memory 200a without causing a preemption of data accessed by the previous or currently owning agent. Therefore, although the currently owning agent may retain ownership of the shared synchronous memory 200a for a significant period of time, a requesting locking agent is allowed to take advantage of the brief periods (i.e., cycles) of inactivity in the memory access request signal from the currently owning agent. Accordingly, locked ownership of the shared synchronous memory can be determined at a pre-arbitration level.

FIG. 10 shows a clock signal of a currently owning agent in waveform (a), waveform (b) shows a repeating memory access request signal from a currently owning agent as presented to the pre-arbiter 920, and waveform (c) shows the select signal output from the arbiter 102a to the shared synchronous memory 200a corresponding to the currently owning agent's ownership of the shared synchronous memory 200a. The pre-arbiter 920 selects an inactive point, e.g., the inactive point 1002 between individual memory access request signals 1040, 1050 to determine a point at which to pass ownership to the requesting locking agent.

After the inactive point 1002, the pre-arbiter 920 may suppress one or more subsequent memory access request signals from any or all non-locking agents or agents not provided with the ability to lock ownership, to provide a locked access to the winning locking agent. When the locking signal from the winning locking agent to the pre-arbiter 920 is terminated, the arbiter 102a may be allowed to arbitrate ownership of the shared synchronous memory 200a based, e.g., on a priority established in the priority encoder 190.

Thus, because the pre-arbiter 920 monitors the raw memory access request signals from the owning agents, it is able to articulate an appropriate time during the constant ownership of a previous agent to pass ownership to a requesting locking agent.

The present invention has particular application in shared memory systems wherein it is preferred that a main agent access a shared synchronous memory without interruption or disruption. Moreover, for high traffic memory accesses where a super agent is repeatedly accessing shared memory, non-super agents can still gain access to the shared memory if the super agent's access is extended.

While the invention has been described with reference to the exemplary embodiments thereof, those skilled in the art will be able to make various modifications to the described embodiments of the invention without departing from the true spirit and scope of the invention.

What is claimed is:

1. A non-preemptive arbitration system comprising:

a non-preemptive pre-arbiter to condition memory access request signals from a plurality of agents sharing a common multiple port synchronous resource;

a non-preemptive arbiter to arbitrate and select one of said plurality of agents for subsequent access to said common multiple port synchronous resource;

said non-preemptive pre-arbiter being capable of conditioning said memory access request signals by suppressing subsequent memory access request signals from one of said plurality of agents which currently accesses said common multiple port synchronous resource when a locking memory access request signal is received from another one of said plurality of agents; and wherein at least one of said plurality of agents directly connects to an individual port of said common multiple port synchronous resource through a respective data bus and a remainder of said plurality of agents connect to an individual port of said common multi-port synchronous resource through said non-preemptive arbiter.

2. The non-preemptive arbitration system according to claim 1, wherein:
said pre-arbiter monitors said memory access request signals to determine a non-preemptive inactive point between memory accesses of said one of said plurality of agents which currently accesses said common multiple port synchronous resource.

3. The non-preemptive arbitration system according to claim 2, wherein:
said pre-arbiter determines open windows in accesses by said currently owning agent to said common multiple port synchronous resource.

4. A non-preemptive method of arbitrating from among a plurality of resource request signals for access to a common multiple port synchronous resource, comprising:
providing non-preemptive access to said common multiple port synchronous resource by a first agent;
monitoring memory access request signals from said first agent to an arbitrator;
determining an inactive memory access cycle in said first agent's access to said common multiple port synchronous resource; and
allowing a second agent non-preemptive access to said common multiple port synchronous resource during said inactive memory access cycle in said first agent's access to said common multiple port synchronous resource; and
wherein said first agent connects to an individual port of said common multiple port synchronous resource through said arbitrator and said second agent directly connects to an individual port of said common multiple port synchronous resource through a respective data bus.

5. The method of arbitrating from among a plurality of resource request signals for access to a common multiple port synchronous resource according to claim 4, further comprising:
suppressing a subsequent memory access signal from said first agent when a locking memory access signal is output by said second agent.

6. The method of arbitrating from among a plurality of resource request signals for access to a common multiple port synchronous resource according to claim 4, wherein:
said access to said first agent is arbitrated access.

7. The method of arbitrating from among a plurality of resource request signals for access to a common multiple port synchronous resource according to claim 4, further comprising:
monitoring said memory access request signals to determine a non-preemptive inactive point between memory accesses of said one of said plurality of agents which currently accesses said common multiple port synchronous resource.

8. The method of arbitrating from among a plurality of resource request signals for access to a common multiple port synchronous resource according to claim 4, further comprising:
determining an open window corresponding to said inactive memory access cycle in said first agent's access to said common multiple port synchronous resource.

9. The method of arbitrating from among a plurality of resource request signals for access to a common multiple port synchronous resource according to claim 8, wherein:
said second agent is allowed to access said common multiple port synchronous resource during said open windows.

10. The method of arbitrating from among a plurality of resource request signals for access to a common multiple port synchronous resource according to claim 4, wherein:
said common multiple port synchronous resource is a shared synchronous memory.

11. Apparatus for non-preemptive arbitrating from among a plurality of resource request signals for access to a common multiple port synchronous resource, comprising:
means for providing non-preemptive access to said common multiple port synchronous resource to a first agent;
means for monitoring memory access request signals from said first agent to an arbitrator;
means for determining an inactive memory access cycle in said first agent's access to said common multiple port synchronous resource; and
means for allowing a second agent non-preemptive access to said common multiple port synchronous resource during said inactive memory access cycle in said first agent's access to said common multiple port synchronous resource; and
wherein said first agent connects to an individual port of said common multiple port synchronous resource through said arbiter and said second agent directly connects to an individual port of said common multiple port synchronous resource through a respective data bus.

12. The apparatus for arbitrating from among a plurality of resource request signals for access to a common multiple port synchronous resource according to claim 11, further comprising:
means for suppressing a subsequent memory access signal from said first agent when a locking memory access signal is output by said second agent.

13. The apparatus for arbitrating from among a plurality of resource request signals for access to a common multiple port synchronous resource according to claim 11, wherein:
said access to said first agent is arbitrated access.

14. The apparatus for arbitrating from among a plurality of resource request signals for access to a common multiple port synchronous resource according to claim 11, further comprising:
means for monitoring said memory access request signals to determine a non-preemptive inactive point between memory accesses of said one of said plurality of agents which currently accesses said common multiple port synchronous resource.

15. The apparatus for arbitrating from among a plurality of resource request signals for access to a common multiple port synchronous resource according to claim 11, further comprising:
means for determining an open window corresponding to said inactive memory access cycle in said first agent's access to said common multiple port synchronous resource.

16. The apparatus for arbitrating from among a plurality of resource request signals for access to a common multiple port synchronous resource according to claim 15, wherein:
said second agent is allowed to access said common multiple port synchronous resource during said open window.

17. The apparatus for arbitrating from among a plurality of resource request signals for access to a common multiple port synchronous resource according to claim 11, wherein:
said common multiple port synchronous resource is a shared synchronous memory.

* * * * *